United States Patent [19]

Takemura et al.

[11] Patent Number: 5,203,294

[45] Date of Patent: Apr. 20, 1993

[54] HORIZONTAL CYLINDER ARRANGEMENT FOR AN INTERNAL COMBUSTION ENGINE

[75] Inventors: Takao Takemura; Yoshikazu Yamaoka; Takahide Watanabe, all of Hamamatsu, Japan

[73] Assignee: Sanshin Kogyo Kabushiki Kaisha, Hamamatsu, Japan

[21] Appl. No.: 857,371

[22] Filed: Mar. 25, 1992

[30] Foreign Application Priority Data

Mar. 26, 1991 [JP] Japan .................................. 3-84511

[51] Int. Cl.⁵ .............................................. F02F 7/00
[52] U.S. Cl. ............................ 123/195 HC; 277/216
[58] Field of Search ..................... 123/195 HC, 193.6; 277/216

[56] References Cited

U.S. PATENT DOCUMENTS 4,291,651 9/1981 Villella .............................. 123/41.32

Primary Examiner—Noah P. Kamen
Attorney, Agent, or Firm—Ernest A. Beutler

[57] ABSTRACT

A four-cycle internal combustion engine which has one or more horizontally disposed cylinder bores and a piston supported for horizontal reciprocation in each cylinder bore. Each piston includes a ring structure wherein a plurality of compression rings are fitted in corresponding parallel grooves formed on the outer periphery of each piston. A positioning pin for each compression ring is press fitted into the groove of the associated ring in its end gap for positioning and holding the end gap of each compression ring at a point along the outer periphery of the piston outside of the area under the piston axis.

9 Claims, 4 Drawing Sheets

HORIZONTAL CYLINDER ARRANGEMENT FOR AN INTERNAL COMBUSTION ENGINE

BACKGROUND OF THE INVENTION

This invention relates to a horizontal cylinder arrangement for an internal combustion engine, and more particularly to a horizontal cylinder arrangement in a four-cycle internal combustion engine in which the pistons are supported for horizontal reciprocation and wherein the pistons have a ring structure for positioning and maintaining the gaps of the piston rings out of the area below the piston axis.

It is common practice to provide the pistons of internal combustion engines with one or more piston rings that are placed in the cylinder and fitted into corresponding grooves formed around the outer peripheries of the pistons. Most engines employ two types of piston rings. One or two compression rings for each piston are typically employed for maintaining compression pressures in the combustion chambers by preventing the combustion gases from leaking out of the combustion chambers and into the crankcase chamber. An oil ring is normally employed in connection with each piston to scrape oil from the inner surface of the cylinders and to prevent the oil in the crankcase chamber from leaking into the combustion chambers. Each type of ring has ends which form a gap when it is placed in the cylinders and fitted in the piston grooves.

Although this type of piston assembly is generally satisfactory, the gaps in the compression rings can create a problem in some internal combustion engine cylinder arrangements, particularly in engines formed with horizontally disposed cylinder bores wherein the pistons reciprocate in the horizontal direction. In particular, there has been a problem in this type of engine arrangement in maintaining the compression ring end gaps out of the area on the outer surfaces of the pistons just below the piston axis.

The reason for this is that during operation of engines formed with horizontally disposed cylinder bores, the weight balance of the rings around the pistons has a tendency to cause the rings and ring end gaps to move circumferentially within their respective grooves and align themselves along the outer surface of their respective piston just under the piston axis in a position in which the rings are quite stable. When this occurs, there is a distinct possibility that any unburned fuel charge in the combustion chambers will flow along the lower inner surface of the cylinder bore through these gaps and into the crankcase chamber. If this unburned fuel charge enters the crankcase chamber, it will dilute and contaminate the oil which is used to lubricate the engine and hence will reduce the lubricating effectiveness of the oil.

This problem is even more likely to occur where the horizontally supported pistons are provided with only one piston ring each which is of the compression ring type. In this case, any unburned fuel charge in the combustion chambers will be able to enter the crankcase chamber through the associated compression ring end gap as soon as that ring is positioned under the piston axis.

It is, therefore, a principal object of this invention to provide a piston ring structure for a four-cycle internal combustion engine which prevents any unburned fuel charge in the combustion chamber from entering the crankcase chamber.

It is another object of this invention to provide a piston ring structure for a four-cycle internal combustion engine wherein the compression ring end gap of each compression ring is positioned and maintained on the outer periphery of the respective piston outside of the area under the piston axis.

SUMMARY OF THE INVENTION

This invention is adapted to be embodied in a cylinder arrangement for a four-cycle internal combustion engine comprising a generally horizontal cylinder bore and a piston positioned for reciprocation within the cylinder bore. The piston is formed with a groove around the outer periphery of the piston. In accordance with the invention, a ring, having a gap, is fitted in the groove formed in the piston, and a pin associated with the ring is used for positioning and maintaining the gap of the ring in the upper 340° of the piston of the outer periphery of the piston.

Another embodiment of the invention is adapted to be embodied in a cylinder arrangement for a four-cycle internal combustion engine comprising a generally horizontal cylinder bore and a piston positioned for reciprocation within the cylinder bore. The piston is formed with a plurality of grooves around the outer periphery of the piston. In accordance with the invention, there is provided a plurality of rings each having a gap and each fitted in a corresponding one of the grooves. A pin is associated with each ring for positioning and maintaining the gap of the associated ring in the upper 340° of the outer periphery of the piston.

DETAILED DESCRIPTION OF THE PREFERRED EMBODIMENTS

Figure 1:
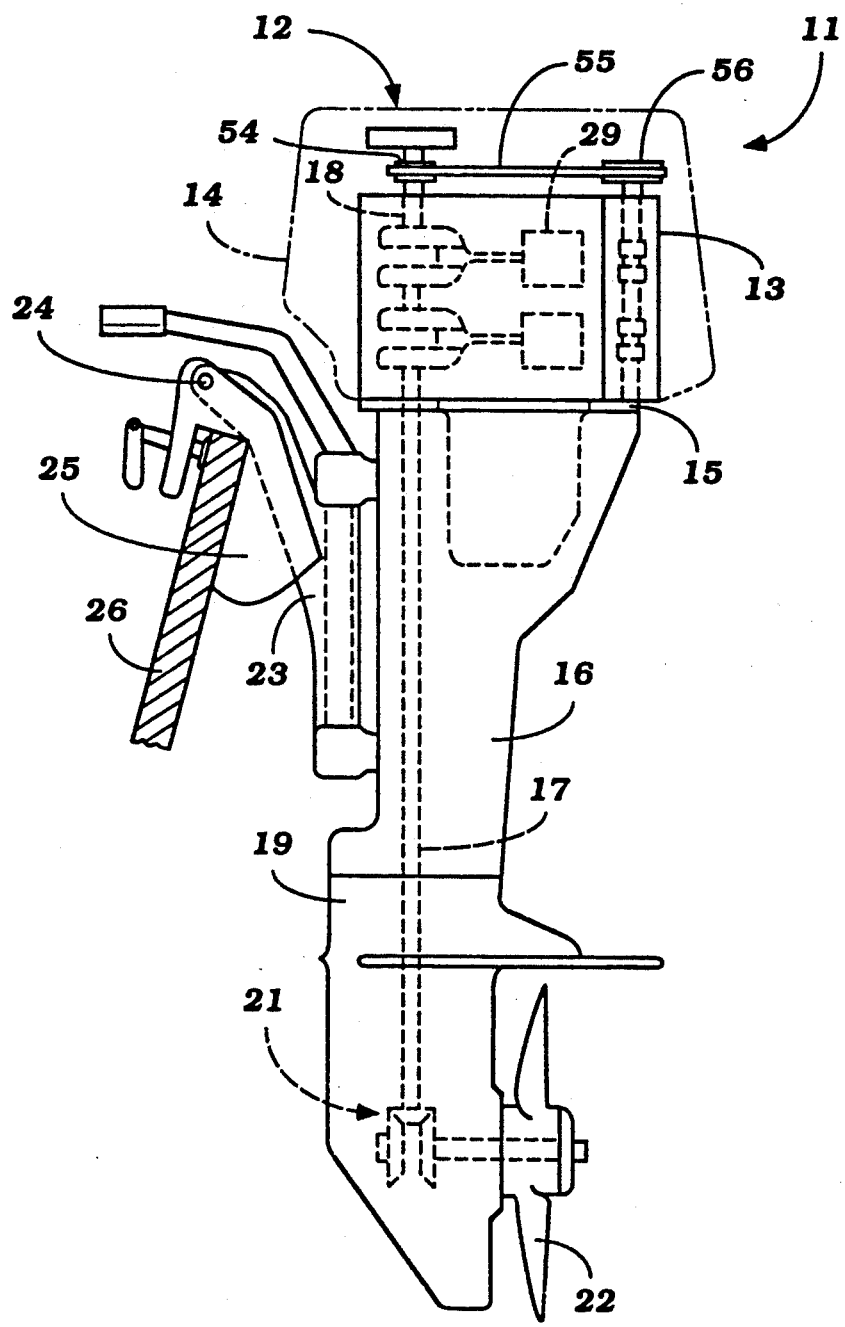
FIG. 1 is a side elevational view of an outboard motor constructed in accordance with an embodiment of the invention and attached to the transom of an associated watercraft that is shown partially and in cross-section.

Referring first to FIG. 1, an outboard motor constructed in accordance with an embodiment of the invention is identified generally by the reference numeral 11. Although the invention is described in conjunction with an outboard motor, it is to be understood that certain facets of the invention may be employed in connection with inboard mounted marine engines as well as with internal combustion engines employed in other applications. The invention has particular utility, however, in conjunction with outboard motors, since such motors frequently employ engines with horizontally formed cylinders.

The outboard motor 11 includes a power head 12 that is comprised of an internal combustion engine 13 which, in the illustrated embodiment, is of the two cylinder, in-line, four-cycle type. It is to be understood, of course, that the invention can be practiced in conjunction with engines having other cylinder numbers.

A protective cowling, shown in phantom and identified by the reference numeral 14, covers the engine 13. The engine 13 is mounted on a spacer plate 15 which, in turn, couples the power head 12 to a driveshaft housing, indicated by the reference numeral 16. A driveshaft 17 is coupled to the engine crankshaft 18 and depends into the driveshaft housing 16 where it is journaled for rotation in an appropriate manner. This driveshaft 17 continues into a lower unit 19 where it drives a forward, neutral, reverse transmission 21 of a known type for driving a propeller 22 in selected forward and reverse directions.

A steering shaft is affixed to the driveshaft housing 16 and is journaled within a swivel bracket assembly 23 for steering of the outboard motor 11 about a generally vertically extending steering axis. The swivel bracket 23 is connected for pivotal movement by a pivot pin 24 to a clamping bracket 25 for tilt and trim movement of the outboard motor 11. The clamping bracket 25 carries a clamping device for affixing the outboard motor 11 to a transom 26 of a watercraft in a known manner.

Figure 2:
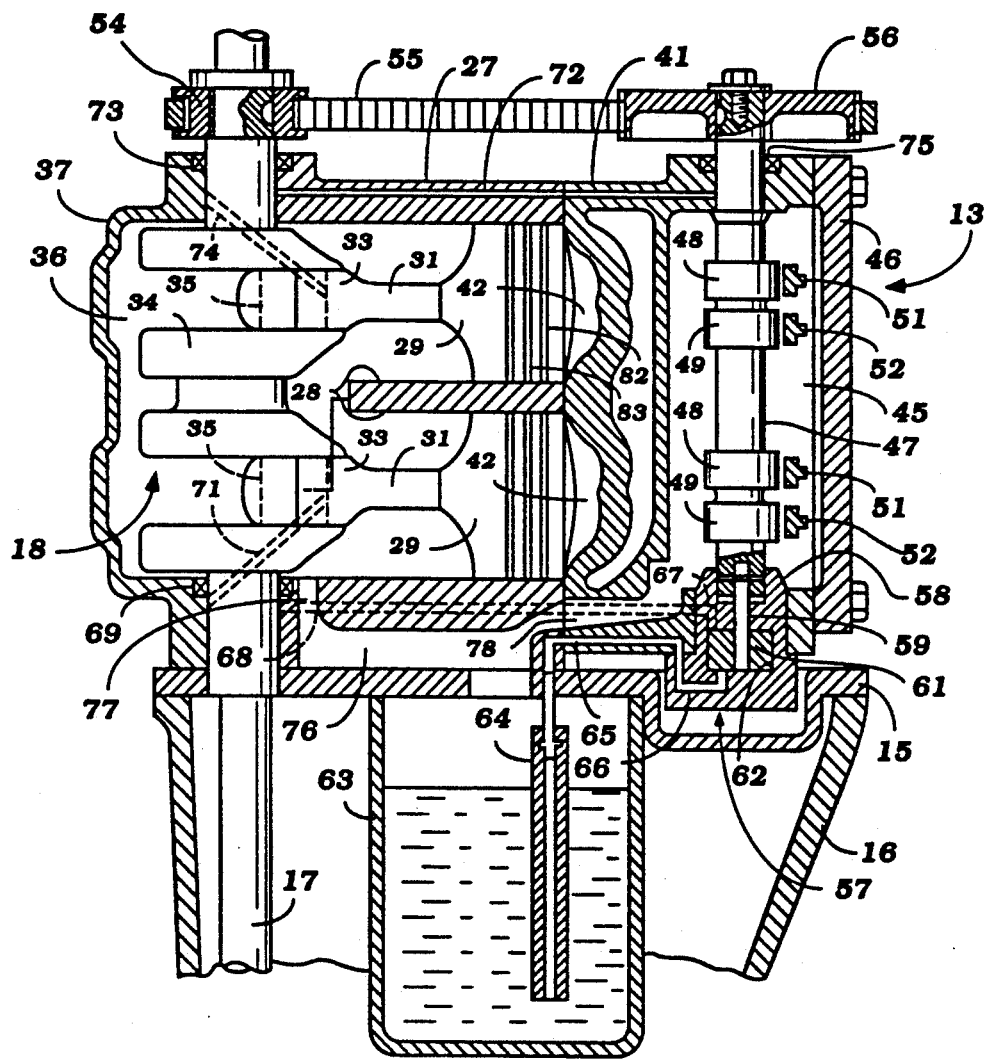
FIG. 2 is an enlarged cross-sectional view taken through the engine of the outboard motor power head and the upper portion of the drive shaft housing.
Figure 3:
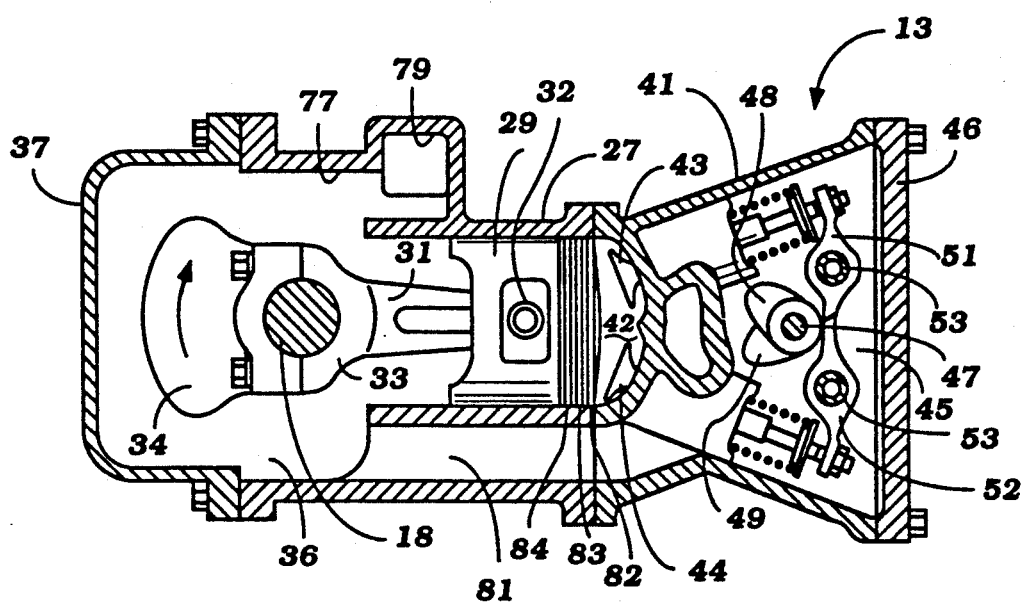
FIG. 3 is a top sectional view of the engine.

Referring now in detail primarily to FIGS. 2 and 3, the engine 13 includes a cylinder block 27 in which two horizontally disposed cylinder bores 28 are formed. Pistons 29 reciprocate in the cylinder bores 28 and are connected to connecting rods 31 by means of piston pins 32. The other (big) ends 33 of the connecting rods 31 are, in turn, connected to the throws 34 of the crankshaft 18 by means of crank pins 35. The crankshaft 18 is journaled within a crankcase chamber 36 in an appropriate manner by means including bearings formed by the cylinder block 27 and a crankcase member 37 that is affixed to the cylinder block 27 in a known manner.

A cylinder head 41 is affixed to the cylinder block 27 at the end opposite the crankcase 37. The cylinder head 41 has recesses 42 which cooperate with the cylinder bores 28 and pistons 29 to form the combustion chambers of the engine 13. Intake valves 43 are supported within the cylinder head 41 and cooperate with valve seats formed at the exit end of intake passages that extend through the cylinder head 41 for controlling the delivery of a charge to the combustion chambers 42. The charge is delivered to the intake passages by a suitable charge forming system (not shown). In a similar manner, exhaust valves 44 are also supported within the cylinder head 41 and cooperate with valve seats formed at the base of exhaust passages for controlling the exit of the exhaust gases from the combustion chambers 42.

The intake and exhaust valves 43 and 44 are operated by means of an operating mechanism supported within a cam chamber 45 formed at the upper end of the cylinder head 41 and closed by a cam cover 46. A single overhead mounted camshaft 47 is journaled within the cam chamber 45 and has lobes 48 and 49 which operate rocker arms 51 and 52, respectively, for opening and closing the valves 43 and 44. The rocker arms 51 and 52 are supported for pivotal movement on a rocker arm shaft 53 which is journaled within the cam chamber 45.

A timing sprocket 54 is affixed to the upper end of the crankshaft 18 and drives a toothed belt 55. The toothed belt 55, in turn, drives a driven sprocket 56 that is affixed to the cam shaft 47 for driving the camshaft 47 at one-half of the crankshaft speed, as is well known in this art.

The engine 13 has a lubricating system that includes a lubricant pump 57 that is driven off of the lower end of the camshaft 47 and which is of the trochoidal type. The pump 57 includes a housing 58 which is nested in part in a recess formed in the lower surface of the cylinder head 41. A pump driveshaft 59 is coupled to the camshaft 47 for driving an impeller 61 that is rotatably disposed within a pump chamber 62.

The lubricant pump 57 draws lubricant from a lubricant reservoir, indicated by the reference numeral 63, through a strainer 64, both of which are suspended from the spacer plate 15. This lubricant is then delivered to the pump 57 through an internal passageway 65 bored in the cylinder head 41 and through a suction passage 66 formed in the pump housing 58. The lubricant is pressurized by the pump 57 and discharged through a pump outlet passage 67 into a main delivery gallery 68 formed in the cylinder head 41 and cylinder block 27 for lubricating the main and connecting rod bearings of the crankshaft 18.

The lubricant is delivered through the main delivery gallery 68 to lubricate the main bearing portion sealed by an oil seal 69 at the lower end of the crankshaft 18. From there, the lubricant flows through a diagonal passageway 71 drilled into the crankshaft 18 to the connecting rod bearing of the lower cylinder 28, after which the lubricant is discharged into the crankcase 36.

A further delivery gallery 72 in communication with delivery gallery 68 extends across the upper end of the cylinder block 27 and cylinder head 41 for supplying lubricant to the upper main bearing of the crankshaft 18 and to the camshaft 47 and associated components. The lubricant flowing toward the crankshaft 18 in delivery gallery 72 lubricates the main bearing portion of the crankshaft 18 sealed by oil seal 73. This lubricant is thereafter transferred through a diagonal passageway 74 formed in the crankshaft 18 for lubricating the connecting rod bearing of the upper cylinder 28. After that, the lubricant is discharged into the crankcase 36. As previously noted, some of the lubricant in the upper delivery gallery 72 flows toward the camshaft 47. This lubricant lubricates the bearing portion of the camshaft 47 sealed by oil seal 75 and then flows down along the camshaft 47 to lubricate the intake and exhaust lobes 48 and 49 and rocker arms 51 and 52, after which it drips into the cam chamber 45.

The lubricant which has been circulated through the engine 13 is then returned to a drain cavity 76 formed in the lower face of the cylinder block 27 from a crankcase drain 77 and a cam chamber drain 78. A mounting hole 79 for a level gauge is formed in the crankcase drain 76.

The engine 13 is also formed with a pressure passage 81 that extends between the crankcase chamber 36 and cam chamber 45 for relieving pressure.

Figure 4:
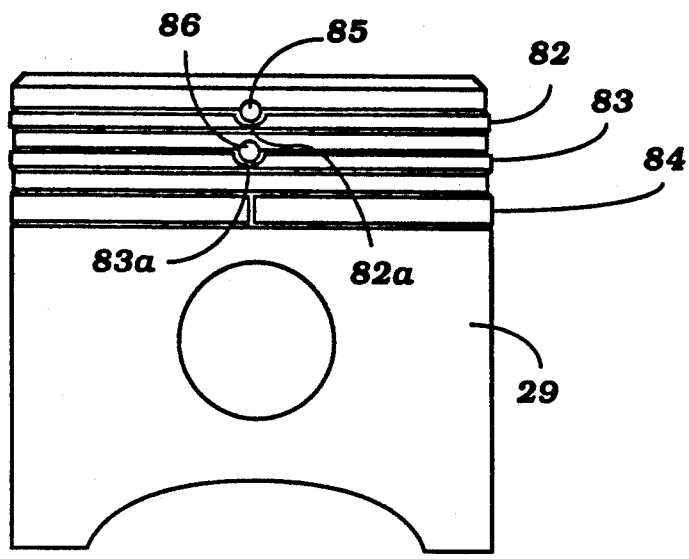
FIG. 4 is a side view of one of the pistons of the engine constructed in accordance with an embodiment of the invention.
Figure 5:
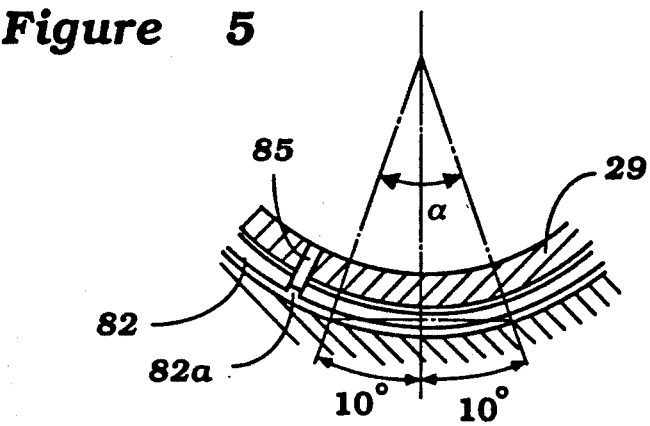
FIG. 5 illustrates one of the piston rings and the positioning of its associated positioning pin relative to an angle that is bisected by a vertical line which intersects and is perpendicular to the piston axis.

Referring now to FIGS. 4 and 5, the construction of one of the pistons 29 is shown in accordance with an embodiment of the invention. In this embodiment, each piston 29 is formed with three grooves that extend around the outer surface of the piston head in parallel relation to one another. Compression rings 82 and 83 are adapted to be fitted into the two top grooves, one in each groove, and an oil ring 84 is adapted to be fitted in the lowermost groove, as seen from FIG. 4. When the compression rings 82 and 83 are placed in the cylinder bore 28 and fitted in the piston grooves, there are end gaps 82a and 83a at the ends of each ring 82 and 83.

In accordance with the invention, positioning pins 85 and 86 are press fitted into the compression ring grooves in the end gaps 82a and 83a respectively for setting and maintaining the position of the end gaps 82a and 83a along the outer periphery of the piston 29 out of the area just under the piston axis. It has been experimentally found that the compression ring end gaps 82a and 83a should preferrably be held along the outer periphery of the piston 29 outside of the area just under the piston axis that is defined by the angle α shown in FIG. 5. This angle α is 20° in the illustrated embodiment and is bisected by a downwardly extending vertical line that intersects, and is perpendicular to, the piston axis. Thus, the angle α covers an area that extends 10° upwardly along the outer periphery of the piston 29 on each side of the vertical line which marks the low point of a given compression ring at their intersection. This means that the pins 85 and 86 position and maintain the ring end gaps 82a and 83a in the upper 340° of the outer periphery of the piston 29.

It is also desireable to set the circumferential position of the end gaps 82a and 83a of the compression rings 82 and 83 in the piston ring grooves so that the position of the end gaps 82a and 83a do not coincide.

With this piston ring construction, the compression rings 82 and 83 and their associated end gaps 82a and 83a are prevented from rotating about the piston axis by the pins 85 and 86 while the positions of gaps 82a and 83a are maintained along the outer periphery of the piston 29 out of the area defined by the angle α. Therefore, even if unburnt fuel remains on the lower surfaces of the combustion chambers 42 after the power stroke, this unburnt fuel will be prevented from flowing along the lower surfaces of the cylinders 28 and into the crankcase chamber 36, since the compression ring end gaps 82a and 83a are not positioned in this area. This, in turn, will prevent the oil in the crankcase chamber 36 from being diluted.

The possibility of unburnt fuel entering the crankcase chamber 36 from the combustion chambers 42 is even greater when the outboard motor 11 is partially trimmed up for shallow water navigation. The reason for this is that when the motor 11 is in this position the cylinders 28 are tilted relative to the level with the crankcase 36 being lower than the combustion chambers 42. However, even in this case any unburnt fuel remaining in the combustion chambers 42 is prevented from flowing into the crankcase chamber 36 when the compression ring end gaps 82a and 83a are positioned out of the area defined by angle α by the positioning pins 85 and 86 which are inserted into the gaps 82a and 83a.

Figure 6:
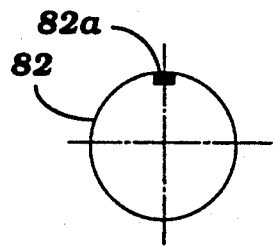
FIG. 6 is a schematic view of a piston having one piston ring, illustrating the positioning of its positioning pin relative to vertical and horizontal coordinate lines that are perpendicular to the piston axis.

FIG. 6 shows another embodiment of the invention wherein each piston 29 has only one piston ring which is a compression ring 82. In this case, the end gap 82a is held by the positioning pin 85 along the outer periphery of the piston 29 immediately above the piston axis at a point where a vertical line that is perpendicular to the piston axis intersects the piston axis.

Figure 7:
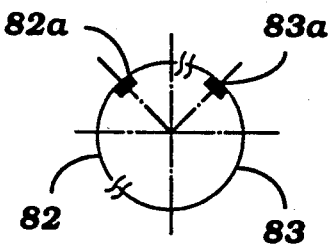
FIG. 7 is a schematic view of a piston having two piston rings, illustrating the positioning of their respective positioning pins relative to vertical and horizontal coordinate lines that are perpendicular to the piston axis.

FIG. 7 shows an embodiment of the invention wherein each piston 29 has two piston compression rings 82 and 83 and wherein their respective gaps 82a and 83a are maintained on the upper half of the piston periphery above the piston axis by the positioning pins 85 and 86.

It should be readily apparent from the foregoing description that embodiments of a very effective piston ring structure have been illustrated and described. This piston ring structure, wherein each compression ring end gap is held by a corresponding positioning pin at a point on the outer surface of the piston that is outside of the area below the piston axis, is particularly effective in preventing the flow of unburnt fuel from the combustion chambers to the crankcase chamber in engines having horizontally disposed cylinders. Although embodiments have been illustrated and described, various changes and modifications may be made without departing from the spirit and scope of the invention, as defined by the appended claims.

We claim:

1. A cylinder arrangement for a four-cycle internal combustion engine comprising a generally horizontal cylinder bore having no side ports formed therein, a piston positioned for reciprocation within said cylinder bore and formed with a groove around the outer periphery of said piston, a ring having a gap and fitted in said groove, and a pin associated with said ring for positioning and maintaining the gap of said ring in the upper 340° of the outer periphery of said piston.

2. A cylinder arrangement as recited in claim 1, wherein said pin is press fitted into said groove int eh gap of said ring.

3. A cylinder arrangement as recited in claim 1, wherein said ring comprises a compression ring.

4. A cylinder arrangement for a four-cycle internal combustion engine comprising a generally horizontal cylinder bore having no side ports formed therein, a piston positioned for reciprocation within said cylinder bore and formed with a plurality of grooves around the outer periphery of said piston, a plurality of rings each having a gap and each fitted in a corresponding one of said grooves, and a pin associated with each ring for positioning and maintaining the gap of the associated ring int the upper 340° of the outer periphery of said piston.

5. A cylinder arrangement as recited in claim 4, wherein each of said pins are press fitted into the corresponding one of said grooves in the gap of said associated ring.

6. A cylinder arrangement as recited in claim 5, wherein said rings comprise compression rings.

7. A cylinder arrangement as recited in claim 5, wherein the gaps of said rings are positioned and maintained so that the positions of the gaps do not coincide.

8. A cylinder arrangement as recited in claim 4, wherein said rings comprise compression rings.

9. A cylinder arrangement as recited in claim 4, wherein the gaps of said rings are positioned and maintained so that the positions of the gaps do not coincide.

* * * * *